2,949,379

METHOD OF PREPARING FINELY DIVIDED ALUMINA-SILICA PIGMENTS

Mathias P. Boland, Wadsworth, Ohio, assignor to Columbia-Southern Chemical Corporation, Allegheny County, Pa., a corporation of Delaware No Drawing. Filed Mar. 18, 1957, Ser. No. 646,556

15 Claims. (Cl. 106—288)

The present invention deals with the manufacture of finely divided alumina-silica pigments which are particularly effective opacifying agents for paper. It further deals with the preparation of paper pigmented with such products.

In application Serial No. 594,390, filed June 28, 1956, now U.S. Patent No. 2,786,757, and assigned to the assignee of this application, preparation of paper from aqueous slurries in which calcium silicate and aluminum sulphate have been reacted is described. Such paper is of enhanced optical properties, e.g. has improved opacity and brightness. A limitation to the practice of that process is the considerable amount of aluminum sulphate usually consumed. Regarded as desirable is a reduction in the aluminum sulphate consumed during the manufacture of paper. Any additional improvement in the optical properties of paper is also of importance.

According to the present invention there is provided a novel process for manufacturing finely divided, precipitated, amorphous alumina-silica pigmentary compositions capable of imparting surprisingly enhanced optical properties to paper. That is, by sheeting paper from pulp slurries including the alumina-silica compositions hereby provided, the sheeted product (paper) is possessed of optical properties such as opacity which represents a still further improvement over properties which are obtained by including calcium silicate and aluminum sulphate in pulp slurries according to the process described in the aforementioned application. A further advantage offered by these compositions of this invention is decreased consumption of aluminum sulphate during the paper manufacturing process. From the ensuing discussion, the significance of these improvements will become even further apparent.

Requisites of a good paper pigment for enhancing optical properties usually require the pigment to have an ultimate particle size above 0.05 micron, preferably in the range of about 0.2 or 0.3 micron. It is exceedingly difficult to prepare effectively an amorphous, precipitated calcium silicate or like alkaline earth metal silicate which has an ultimate particle size within this range.

Surprisingly, however, paper having remarkably acceptable opacity and brightness can be prepared from calcium silicate of low ultimate particle size provided that the calcium silicate is in the form of flocs of ultimate particles wherein a majority of such flocs are below 7 microns in size. Thus, when at least 55 percent by weight of the silicate pigment is in the form of flocs below 7 microns, the preponderant weight of which range in size from 0.5 to 7 micron, paper may be provided having very good opacity and brightness. Even further improvement in optical properties, such as opacity and brightness, are obtained when the floc size of the pigment is such that 75 percent to 90 percent by weight of the siliceous pigment is below 7 microns in floc size.

A novel method now has been discovered whereby precipitated, flocculated, finely divided, amorphous, siliceous pigmentary compositions may be prepared having floc sizes primarily from 0.5 to 7 micron. According to this invention, these pigmentary compositions are realized by partially reacting calcium silicate (or like alkaline earth metal silicate) with aluminum sulphate (or like water soluble aluminum salt), the amount of aluminum sulphate being sufficient to react with from 30 to 70 percent, and most appropriately 40 to 65 percent, of the calcium silicate. That is, calcium silicate is reacted with from 30 to 70 percent of the stoichiometric quantity of aluminum sulphate required for complete reaction with the calcium silicate. The resulting finely divided, precipitated, amorphous, siliceous pigmentary composition, a calcium oxide-alumina-silica mixture, after recovery and usually drying is thereafter reacted with aluminum sulphate or like water soluble aluminum salt, such that more than half of the remaining calcium oxide available for reaction, and preferably substantially all of the calcium oxide present in the mixture, is reacted (or neutralized) yielding an alumina-silica pigmentary composition. The latter step may be conducted in situ in the pulp slurry if desired.

It is not intended that the present invention be construed as being based upon the following explanation of what apparently occurs, but experimental evidence indicates this invention provides pigments having flocs of which at least 75 percent, and more usually about 90 percent by weight, are 0.5 to 7 microns in size. Both photomicrograph studies and the marked improvement in optical properties of paper prepared from such pigments attest to the fact that unusually accurate pigment floc size control is achieved. This is quite unexpected.

Apparently, when only less than 30 percent of the stoichiometric quantity of aluminum sulphate is reacted with calcium silicate, the resulting pigment is of 30 to 60 microns in floc size. On the other hand, when the amount of aluminum sulphate is sufficient to react with more than 30 percent of the calcium silicate, the number of 30 to 60 micron flocs quite surprisingly decreases sharply. The pigment which results by employing about 40 percent to about 65 percent of the stoichiometric amount of aluminum sulphate is comprised of smaller sized flocs, on the order of 1 or 2 microns.

Further, it has now been found that by recovering the siliceous pigmentary composition provided by reacting calcium silicate or the like alkaline earth metal silicate with between 30 and 70 percent of stoichiometric requirements of an aluminum salt such as aluminum sulphate and thereafter reacting such pigmentary composition with aluminum sulphate or a like aluminum salt, in the presence or absence of paper pulp, that a siliceous alumina-silica pigmentary composition is provided which is predominantly comprised of 0.5 to 7 microns in floc size. At least about 50 percent of the alkaline earth metal oxide, and preferably substantially all, still present in the alumina-silica composition is reacted with the aluminum salt in this second reaction to provide a pigment eminently suited for incorporation in paper.

In a typical performance of this invention, calcium silicate is partially reacted in aqueous slurry with sufficient aluminum sulphate being present to react with between 30 and 70 percent, and preferably between about 40 and 65 percent, of the calcium silicate. Aqueous slurries sufficiently dilute to dissolve essentially all of the calcium sulphate or equivalent alkaline earth metal salt, provided as a by-product of the reaction, are usually preferred. Since calcium sulphate is of limited water solubility, quite dilute slurries are recommended. The resulting slurry is subsequently treated to recover the solids, as by decantation, filtration, centrifugation, or combinations thereof or like mechanical separations. If desired, the separated pigmentary siliceous composition may have further water removed as by drying at temperatures of 105° C. or higher. It may be comminuted by mechanical or the like pulverizing techniques.

This product may be regarded as a mixture of calcium silicate and aluminum silicate. It is not, however, exactly clear how the calcium oxide, aluminum oxide and silica are physically and chemically combined. The composition may also contain the alkaline earth metal salt which is a by-product of the reaction, e.g. calcium sulphate, when the reaction medium is not sufficiently dilute to dissolve all the calcium sulphate. For some purposes, retention of calcium sulphate in the product is of advantage in the use thereof, or in minimizing the need for washing.

Thus, the water content of the reaction medium may be so adjusted and the separation of product therefrom be so performed that a major portion of this calcium sulphate, e.g. 50 to 95 percent, is retained.

This calcium oxide-aluminum oxide-silica composition is reacted with aluminum sulphate in an aqueous slurry in which paper pulp may be included. Sufficient aluminum sulphate to react with at least half, and usually substantially all, e.g. less than 5 percent of the product is as CaO, of the calcium oxide present is used. When all the calcium oxide is reacted with aluminum sulphate, the resulting pigmentary composition is an alumina-silica product containing 3 to 20 moles or more of $SiO_2$ per mole of $Al_2O_3$ (alumina).

Performance of the present invention is most effective when the calcium silicate, or like alkaline earth silicates, is as a finely divided, precipitated, amorphous product having an ultimate particle size of 0.01 to 0.05 micron, or at least below 0.1 micron. Such calcium silicates are of 10 to 100 or 200 square meters per gram in BET surface area.

Preparation of calcium silicate or other alkaline earth metal silicates in finely divided state, such as is herein most aptly employed, may be accomplished by mixing a stream of aqueous calcium chloride (or other alkaline earth metal chloride) solution with a stream of aqueous sodium silicate solution under conditions which subject the mixture to a high degree of turbulence and almost instantaneous mixing. The amount of reactants in the respective streams is so proportioned as to obtain calcium silicate in the desired concentration and to establish an excess of calcium chloride over the stoichiometric quantity required to react with the silicate. One effective way to produce the required turbulence is to introduce the two streams closely together into a central area of a centrifugal pump. In this case, agitation of the mixture is the consequence of throwing radially outward by the pump motor of the introduced streams of reactants.

Usually, it is desirable to limit the feed of calcium chloride and alkali metal silicate solutions entering the pump to an amount below the pump capacity. For example, if the pump is capable of discharging 100 gallons per minute, the amount of reacting solution applied to the pump is held to at least 10 percent below, and usually to 35 percent or much more below this amount. This apparently affords a greater degree of agitation in the reaction solution and insures production of a calcium silicate having the desired particle size.

Further, it is desired to adjust the concentration of silicate and calcium chloride in the solutions such that the calcium silicate will be prepared in a concentration approximately equal to about 5 to 25 grams of calcium silicate per liter of solution of slurry. Moreover, to insure production of a calcium silicate of extremely small particle size, an alkali metal silicate having the composition $Na_2O(SiO_2)_x$ where $x$ is a number not less than 2 nor more than 5 is preferably used. This results in production of a calcium silicate having the composition $$CaO(SiO_2)_x$$

where $x$ is a number not less than 2 nor more than about 5. However, other calcium silicates, including mixed silicates of calcium and other metals such as sodium, potassium, and/or aluminum where $x$ is higher or lower than this range, may be used according to the above described method if desired.

Besides calcium silicate, other alkaline earth metal silicates such as barium, strontium and magnesium silicates may be used in the performance of this invention. Such silicates may be prepared by reacting the corresponding metal chloride with sodium silicate according to the method above discussed. Moreover, calcium silicates may be reacted with the corresponding metal oxide of these alkali metals and the resulting silicate reacted in accordance therewith.

Calcium silicate or other alkaline earth metal silicates prepared by processes other than the above described may also be treated in accordance herewith to prepare alumina-silica pigments especially valuable for enhancing the optical properties of paper. For example, a slurry of calcium silicate may be treated which is produced by a batch process in which the sodium silicate is added to a pool of calcium chloride solution or vice versa, under conditions such that the degree of agitation of the pool is low.

It will be further understood that other water soluble aluminum salts besides aluminum sulphate are useful. Aluminum salts, the anion of which forms a water soluble alkaline earth metal salt, are most efficient. Aluminum chloride, aluminum nitrate, etc., are among those included. Salts which are soluble to the extent of at least 2 or 3 grams per liter of water are water soluble as herein intended.

The following examples illustrate the manner in which the present invention may be practiced:

EXAMPLE I

An aqueous slurry of calcium silicate produced by the above described method in which solutions of sodium silicate and calcium chloride are mixed under conditions of violent agitation provided by the centrifugal action of the pump was divided up into batches containing 400 grams of calcium silicate (basis calcium silicate dried at 105° C.). The slurry contained 5.4 weight percent calcium silicate (basis dry weight), 48 grams per liter of sodium chloride and 34 grams per liter of calcium chloride. Calcium silicate so prepared contained 3.25 moles of $SiO_2$ per mole of CaO and had a surface area of 96 square meters per gram. When recovered from the slurry and dried, the calcium silicate was a white, finely divided, precipitated, amorphous, flocculent material having an ultimate particle size of less than 1.0 micron and more particularly from 0.01 to 0.05, averaging .03 micron. Such calcium silicate has a typical analysis:

| | Weight percent |
|---|---|
| $SiO_2$ | 65.58 |
| $R_2O_3$ | 0.59 |
| $Fe_2O_3$ | 0.17 |
| CaO | 18.80 |
| MgO | 0.18 |
| NaCl | 0.81 |
| Ignition loss at 1000° C. | 12.88 |

By experiment, it was determined that approximately 640 milliliters of an aqueous solution of alum containing 500 grams per liter of alum as $Al_2(SO_4)_3 \cdot 18H_2O$ was required to neutralize completely (extract essentially all of the calcium oxide) the calcium silicate present in a single batch containing 400 grams of calcium silicate.

Different quantities of an aqueous alum solution (containing 500 grams per liter of $Al_2(SO_4)_3 \cdot 18H_2O$) were added to separate batches of the calcium silicate slurry at about 25° C. according to the data tabulated in the following table:

Table I

| Batch | Volume of Alum Solution Added (milliliters) | Amount of Added Alum Equivalent to Percent Neutralization | pH of Slurry | BET,[1] m.²/gm. |
|---|---|---|---|---|
| A (Control) | 0 | 0 | | |
| B | 64 | 9.9 | 8.5 | 123 |
| C | 224 | 34.7 | 8.3 | 169 |
| D | 320 | 49.5 | 8.2 | 180 |
| E | 416 | 64.3 | 7.7 | 239 |
| F | 576 | 89.0 | 6.2 | 127 |
| G | 640 | 99.0 | 4.7 | 130 |

[1] Surface area, square meters per gram, as measured by the Brunauer-Emmet-Teller method.

Slurries of alumina-silica compositions so produced were filtered, washed, oven dried at 105° C. and micropulverized. Samples of the material prepared in batches D and E were analyzed with these results:

Table II

| | Analysis Sample, Batch D (Weight Percent) | Analysis Sample, Batch E (Weight Percent) |
|---|---|---|
| $SiO_2$ | 54.7 | 52.8 |
| $R_2O_3$ | 6.8 | 8.0 |
| $Fe_2O_3$ | 0.08 | 0.08 |
| CaO | 13.85 | 12.94 |
| $SO_3$ | 8.81 | 11.36 |
| Na | <0.01 | <0.01 |
| Cl | <0.01 | <0.01 |
| Loss on Drying at 105° C | 8.6 | 8.5 |
| Ignition Loss at 1,000° C | 16.5 | 15.4 |
| pH | 8.6 | 8.3 |

The pH refers to the pH of the slurry produced by re-slurrying in water the washed, dried composition. Weight percent loss at 105° C. is the "free water" in the pigment as measured by loss in weight due to removal of water by drying at 105° C. for 24 hours. Weight percent loss on ignition represents the amount of water lost while heating the pigment at 1000° C. Ignition loss measures the "bound water" and "free water" found in the pigment, "bound water" being the difference between the ignition loss and loss of weight by heating at 105° C. Apparently, the "bound water" is chemically combined in the pigment and not readily removed except by rather severe heat treatment.

Samples of the pigments produced (batches A through G inclusive) were studied under an optical microscope and by use of photomicrographs. Sample A (the control) was comprised mainly of large aggregates measuring from 30 to 60 microns in diameter. Photomicrographs of sample B indicated it contained substantially fewer aggregates measuring from 30 to 60 microns in diameter than sample A. The number of aggregates in the 30 to 60 micron diameter range decreases in pigments prepared with greater amounts of alum. Thus, sample C was comprised of considerably less of such large aggregates than sample B.

This decrease in large aggregates with increased degrees of neutralization was observed with all products prepared using less than 50 percent of the alum required for complete neutralization. Products prepared using from about 40 or 50 percent and 65 percent of the alum required for complete neutralization were practically free of aggregates. Photomicrographs of samples D and E indicated practical absence of 30 to 60 micron flocs as well as any flocs of discernible size.

Products prepared with above about 65 percent of alum required for full neutralization contained increasing amounts of larger aggregates.

Surprisingly enough, it has been found in accordance herewith that by partially reacting of neutralizing calcium silicate (to the extent of 30 to 70 percent of complete neutralization) with aluminum sulphate in a calcium silicate slurry such as is provided by reaction of sodium silicate and calcium chloride, a pigmentary calcium silicate-alumina-silica composition is obtained which after recovery, drying and mechanical pulverizing is admirably suited for enhancing the optical properties (opacity and brightness) of paper. Paper of enhanced optical properties is provided by including the partially neutralized calcium silicate composition in the pulp slurry along with aluminum sulphate and sheeting the slurry into paper. Reaction between the composition and aluminum sulphate occurs with the result that an alumina-silica (aluminum silicate) composition apparently comprised in the main of flocs sized between 0.5 and 7 microns is dispersed in the sheet. Optical properties of such paper are superior to those of papers prepared by including unneutralized calcium silicate and aluminum pulp slurries prior to sheeting.

The following example illustrates the manner in which paper may be prepared in performance of this invention and the enhanced optical properties which result by employing a 30 to 65 or 70 percent neutralized calcium silicate composition in the pulp slurry.

EXAMPLE II

A series of paper making experiments were performed in the described manner.

A pulp beater was charged with 500 grams of bleached kraft pulp dispersed in 23 liters of water and beaten in a Niagara beater for about 95 minutes to approximately 400 millimeters freeness (Canadian Standard). A 7.0 kilogram portion of this beaten pulp was transferred to a rubberized drum and further mixed with an Eastern mixer.

A 300 cubic centimeter portion of an aqueous slurry containing 14 grams of a pigment produced by the process described in Example I above was then mixed with the above pulp slurry for an additional 5 minutes. Sufficient $Al_2(SO_4)_3 \cdot 18H_2O$ was added to the slurry to adjust the slurry in white water to about pH 5. Depending on the particular pigment and its degree of neutralization, according to the process described in Example 1, this quantity varied but was sufficient to further neutralize the pigment.

Thus, a slurry containing 10 percent of the sample pigment based on the dry weight of the pulp was provided. This pulp slurry was then sheeted on a laboratory Noble-Wood sheeting machine.

Representative sheets of the respective runs made with the different pigment samples were tested to determine their opacity, brightness, tear, burst factor and ash content. Table III lists the results of such analyses:

Table III

| Pigment Sample | Percent Calcium Silicate Neutralized | Paper Properties | | | | |
|---|---|---|---|---|---|---|
| | | Ash, Weight | Opacity | Brightness | Tear[1] | Burst[2] |
| A | 0 | 6.0 | 74.3 | 77.4 | 33 | 10.2 |
| B | 9.9 | 6.2 | 72.9 | 74.9 | 31 | 11.1 |
| C | 34.7 | 5.8 | 78.2 | 80.1 | 33 | 10.0 |
| D | 49.5 | 5.7 | 79.8 | 80.1 | 39 | 9.0 |
| E | 64.3 | 4.6 | 77.2 | 79.5 | 35 | 9.7 |
| F | 89.0 | 2.7 | 73.5 | 77.7 | 34 | 10.9 |
| G | 99.0 | 4.8 | 75.3 | 79.7 | 34 | 10.2 |

[1] Tear factor—grams/per gram of sheet 8″ by 8″.
[2] Burst factor—pounds per square inch per gram of sheet 8″ by 8″.

Analysis of the pigment content of the sheeted paper as prepared above indicates reaction between the composition and the aluminum sulphate in the slurry.

From the foregoing data, the marked significant enhancement in optical properties (opacity and brightness) of paper prepared from pigments resulting from the neutralization of calcium silicate with alum is evident. Thus, the opacity of papers prepared from calcium silicate pigments partially neutralized to such an extent ranges from 77 to 80, whereas with but a 10 percent aluminum sulphate neutralized pigment, the opacity is but about 73 percent and with 90 percent neutralization, the opacity is but 73.5. Comparable differences in the brightness of the respective papers is also shown.

According to a further embodiment of the present invention, an aqueous slurry of finely divided calcium silicate such as provided by reaction of sodium silicate and calcium chloride may be treated to prepare pigments useful, among other things, for enhancing the optical properties of paper by gradually adding aluminum sulphate as a solid or in solution to the slurry until the slurry pH has decreased to between about 7.2 and 8.1. Aqueous slurries of calcium silicate having the formula $CaO(SiO_2)_x$ where $x$ is 2 to 5 and more preferably 2.5 to 4, are usually of pH 10 to 11. As aluminum sulphate is added and reaction between calcium silicate and aluminum sulphate occurs, the pH of the slurry declines. When the pH of the slurry has decreased to between 7.2 and 8.1, between about 30 and 70 percent of the calcium silicate has been neutralized. Thus, one procedure for performing the partial neutralization of calcium silicate in accordance with the present invention is to measure the degree of neutralization by determining the pH to which the calcium silicate slurry is reduced.

Example III illustrates the relationship of the degree of calcium silicate neutralization in aqueous slurry and the slurry pH.

EXAMPLE III

A slurry was prepared containing in 95 grams of water 5 grams of finely divided calcium silicate of a composition $CaO(SiO_2)_{3.3}$ which was dried at 100–130° C. to the point where it contained about 5 percent by weight of bound water and about 5 percent by weight of free water. To this slurry was added portions of 0.5 molar aluminum sulphate water solution, and after each addition, the slurry was agitated at room temperature for about 5 minutes. Thereupon, the pH of the slurry was measured with these results:

*Table IV*

| Grams of Aluminum Sulphate Added | Percent of Complete Neutralization | pH of Resulting Slurry |
| --- | --- | --- |
| 0.00 | 0 | 10.18 |
| 0.352 | 15.7 | 8.40 |
| 0.528 | 23.7 | 8.23 |
| 0.704 | 31.3 | 8.02 |
| 0.880 | 39.3 | 7.88 |
| 1.056 | 47.0 | 7.80 |
| 1.408 | 66.0 | 7.30 |
| 1.760 | 78.5 | 5.75 |
| 2.112 | 94.0 | 4.10 |

It will be appreciated that the presence of materials other than calcium silicate and aluminum sulphate may mask the pH of the slurry insofar as such measurement is intended to define the degree of neutralization. As used herein, the pH measurements are intended to denote those which are obtained by measuring a calcium silicate slurry containing 3.2 to 3.4 moles of $SiO_2$ per mole of CaO with primarily only sodium chloride and calcium chloride present and being free from significant quantities of other materials which might alter or mask the pH.

As indicated, aluminum salts other than aluminum sulphate are suitable. The following examples illustrate the use of aluminum chloride:

EXAMPLE IV

An aqueous slurry of calcium silicate was prepared by reacting with gentle agitation aqueous solutions of sodium silicate and calcium chloride. This slurry contained 8.72 weight percent of calcium silicate (dry weight basis of calcium silicate), 4.02 grams per liter of calcium chloride, 54.63 grams per liter of sodium chloride, and was essentially free of sodium silicate. The calcium silicate had the following analysis:

| | | |
| --- | --- | --- |
| $SiO_2$ | weight percent | 64.4 |
| $R_2O_3$ | do | 1.05 |
| CaO | do | 17.5 |
| Na | do | 1.08 |
| Cl | do | .02 |
| Loss of drying at 105° C. | do | 6.89 |
| Ignition loss at 1000° C. | do | 15.9 |
| Surface area | square meters per gram | 44 |

A plurality of equal batches of this slurry were provided each containing 800 grams of dry solids. Each batch was stirred in a bucket and an amount of aluminum chloride (as $AlCl_3 \cdot 6H_2O$) in aqueous solution sufficient to provide the indicated degree of partial neutralization was added. After five minutes of stirring, the pH was obtained, and half the slurry was filtered, the filter cake washed with water, dried in an oven at 105° C. and milled by passage through a micropulverizer.

Table V lists the pertinent data of such preparations:

*Table V*

| Batch | Amount of $AlCl_3$ Added Equivalent to Degree of Neutralization, Percent | Slurry, pH | BET Surface Area of Product, m.²/gm. |
| --- | --- | --- | --- |
| 1 (Control) | 0 | 9.5 | |
| 2 | 25 | 8.2 | 89 |
| 3 | 40 | 8.0 | 130 |
| 4 | 50 | 7.9 | 174 |
| 5 | 60 | 7.1 | 218 |
| 6 | 75 | 5.4 | 323 |

The above pigments from batches 1 through 6 were then reacted with aluminum sulphate in a pulp slurry and paper sheeted from the slurry according to the procedure of Example II with these results:

*Table VI*

| Pigment Sample | Percent Calcium Silicate Neutralized | Paper Properties | | | | |
| --- | --- | --- | --- | --- | --- | --- |
| | | Ash, Weight Percent | Opacity | Brightness | Tear | Burst |
| 1 | 0 | 6.9 | 80.1 | 79.8 | 42 | 8.3 |
| 2 | 25 | 6.8 | 81.3 | 81.1 | 44 | 7.3 |
| 3 | 40 | 6.8 | 83.8 | 80.2 | 39 | 8.4 |
| 4 | 50 | 7.0 | 83.1 | 79.7 | 37 | 7.6 |
| 5 | 60 | 5.8 | 81.6 | 80.0 | 41 | 8.7 |
| 6 | 75 | 4.2 | 77.7 | 79.6 | 34 | 10.0 |

It will be appreciated that this process is applicable to the preparation of pigmented papers from all acceptable cellulosic pulps, e.g. sulfite pulp, soda or kraft pulp, semi-chemical pulp, mechanically ground pulp and mixtures of such pulps. Sufficient pigment is included in these pulp slurries to constitute from 0.5 to 30, more usually 1.0 to 6.0, percent by weight of the pulp on a dry basis. Sized or unsized papers can be prepared. The pulp may be bleached and coloring matter may be included.

While the present invention has been described with reference to specific details of certain embodiments, it is to be understood that the invention is not to be construed as limited to such details as such except insofar as they appear in the following claims:

I claim:
1. The method which comprises partially reacting in aqueous media a finely divided alkaline earth metal silicate having an average ultimate particle size of less than

1 micron with from 30 to 70 percent of stoichiometric of a water soluble aluminum salt having an anion which forms a water soluble alkaline earth metal salt, separating the resulting composition, and reacting said composition with sufficient water soluble aluminum salt to react with at least half the alkaline earth metal oxide present in said composition in aqueous media whereby to form a pigmentary finely divided alumina-silica composition.

2. The method which comprises partially reacting in aqueous media a finely divided alkaline earth metal silicate having an average ultimate particle size of less than 1 micron with from 30 to 70 percent of stoichiometric of a water soluble aluminum salt having an anion which forms a water soluble alkaline earth metal salt, separating the resulting composition, and reacting said composition with sufficient aluminum sulphate to react with at least half the alkaline earth metal oxide present in the composition in aqueous media whereby to form a pigmentary finely divided alumina-silica composition.

3. A method which comprises partially reacting an aqueous slurry of finely divided calcium silicate having an average ultimate particle size of less than 1 micron with 30 to 70 percent of stoichiometric of a water soluble aluminum salt, the anion of which forms a water soluble calcium salt, separating the resulting water insoluble composition, reacting said composition with sufficient water soluble aluminum salt to react with at least half the calcium oxide present in the composition in aqueous slurry whereby to form a pigmentary finely divided alumina-silica composition.

4. A method which comprises partially reacting an aqueous slurry of finely divided calcium silicate having an average ultimate particle size of less than 1 micron with 30 to 70 percent of stoichiometric of a water soluble aluminum salt, the anion of which forms a water soluble calcium salt, separating the resulting water insoluble composition, reacting said composition with sufficient aluminum sulphate to react with at least half the calcium oxide present in the composition whereby to form a pigmentary finely divided alumina-silica product.

5. The method of preparing a finely divided pigmentary alumina-silica composition which comprises partially reacting an aqueous slurry of a finely divided, precipitated calcium silicate having an average ultimate particle size of less than 1 micron with 30 to 70 percent of stoichiometric of aluminum sulphate whereby to form a calcium silicate-alumina-silica composition, separating said composition from the slurry and reacting said separated composition in aqueous slurry with sufficient aluminum sulphate to react with at least half the calcium oxide present in the composition.

6. The method of claim 1 wherein the aqueous medium in which reactions of the separated composition with aluminum salt is conducted contains cellulosic paper pulp.

7. The method of preparing a pigmentary composition which comprises forming an aqueous slurry of finely divided precipitated alkaline earth metal silicate having an average ultimate particle size of less than 1 micron by reaction in aqueous media of an alkali metal silicate and alkaline earth metal salt, partially reacting said slurry with 30 to 70 percent of stoichiometric of a water soluble aluminum salt, the anion of which forms a water soluble alkaline earth metal salt whereby to form a composition including alkaline earth metal silicate, alumina and silica, separating such composition from the slurry and in aqueous media reacting the composition with sufficient water soluble aluminum salt to react with at least half the alkaline earth metal oxide present in the composition.

8. The method of claim 7 wherein aluminum sulphate is the aluminum salt.

9. The method which comprises forming an aqueous slurry of finely divided precipitated calcium silicate having an average ultimate particle size of less than 1 micron by reaction in aqueous media of calcium chloride and sodium silicate, partially reacting the slurry with 30 to 70 percent of stoichiometric of aluminum sulphate, recovering, drying and mechanically subdividing the resulting composition, and thereafter reacting the composition with sufficient aluminum sulphate to react with at least half the calcium oxide present in the composition whereby to form a pigmentary finely divided alumina-silica composition.

10. A method of preparing a finely divided alumina-silica composition particularly useful for pigmenting paper which comprises forming an alkaline earth metal silicate slurry by reaction in aqueous media of an alkali metal silicate and an alkaline earth metal salt, said alkaline earth metal silicate having an ultimate particle size of less than 1 micron, partially reacting said slurry with 30 to 70 percent of stoichiometric of a water soluble aluminum salt, the anion of which forms a water soluble alkaline earth metal salt, whereby to form a composition of alkaline earth metal silicate, alumina and silica, separating water insoluble components of the slurry and in aqueous media reacting said separated material with sufficient water soluble aluminum salt to react with at least half the alkaline earth metal oxide present in said composition.

11. The method of claim 10 wherein the alkaline earth metal salt is calcium chloride.

12. The method of claim 10 wherein the aluminum salt is aluminum sulphate.

13. The method of claim 1 wherein the amount of aluminum salt is sufficient to react with substantially all of the alkaline earth metal oxide present in said composition.

14. The method of claim 10 wherein the amount of aluminum salt is sufficient to react with essentially all of the alkaline earth metal oxide present in said composition.

15. The method of claim 10 wherein the amount of aluminum salt is sufficient to react with substantially all of the alkaline earth metal oxide present in the composition whereby the resulting alumina-silica composition contains less than 5 percent alkaline earth metal oxide.

References Cited in the file of this patent

UNITED STATES PATENTS

| | | |
|---|---|---|
| 2,739,073 | Bertorelli | Mar. 20, 1956 |
| 2,786,758 | Taylor | Mar. 26, 1957 |
| 2,786,776 | Allen | Mar. 26, 1957 |
| 2,786,777 | Allen | Mar. 26, 1957 |

UNITED STATES PATENT OFFICE
CERTIFICATE OF CORRECTION

Patent No. 2,949,379                                                August 16, 1960

Mathias P. Boland

It is hereby certified that error appears in the above numbered patent requiring correction and that the said Letters Patent should read as corrected below.

Column 2, line 13, for "reequired" read -- required --; column 6, Table III, heading to column 3 thereof, for "Ash, Weight" read -- Ash, Weight Percent --.

Signed and sealed this 9th day of January 1962.

(SEAL)
Attest:

ERNEST W. SWIDER                                  DAVID L. LADD

Attesting Officer                                     Commissioner of Patents